(12) United States Patent
Weigel

(10) Patent No.: US 7,276,870 B2
(45) Date of Patent: Oct. 2, 2007

(54) ARRANGEMENT FOR OVERLOAD PROTECTION AND METHOD FOR REDUCING THE CURRENT CONSUMPTION IN THE EVENT OF MAINS VOLTAGE FLUCTUATIONS

(76) Inventor: Roland Weigel, Kramenwiesstrasse 14, 9652 Neu St. Johann (CH)

( * ) Notice: Subject to any disclaimer, the term of this patent is extended or adjusted under 35 U.S.C. 154(b) by 203 days.

(21) Appl. No.: 11/001,644

(22) Filed: Dec. 2, 2004

(65) Prior Publication Data
US 2005/0162787 A1    Jul. 28, 2005

(30) Foreign Application Priority Data
Dec. 2, 2003    (EP)    .................................. 03027648

(51) Int. Cl.
*F04B 49/06* (2006.01)
*F04B 49/10* (2006.01)
(52) U.S. Cl. ..................... 318/434; 318/430; 361/33; 417/19; 417/42
(58) Field of Classification Search ........ 318/430–434, 318/459, 479, 481; 361/23–34; 417/18–24, 417/42
See application file for complete search history.

(56) References Cited

U.S. PATENT DOCUMENTS

| | | | | |
|---|---|---|---|---|
| 3,585,451 A | | 6/1971 | Day | |
| 4,291,543 A | * | 9/1981 | Alluto | 62/158 |
| 4,510,547 A | * | 4/1985 | Rudich, Jr. | 361/22 |
| 4,912,936 A | * | 4/1990 | Denpou | 62/158 |
| 5,516,265 A | * | 5/1996 | Harrison et al. | 417/12 |
| 5,519,301 A | * | 5/1996 | Yoshida et al. | 318/811 |
| 5,663,627 A | * | 9/1997 | Ogawa | 318/803 |
| 6,020,702 A | * | 2/2000 | Farr | 318/434 |
| 6,238,188 B1 | * | 5/2001 | Lifson | 417/42 |
| 6,438,973 B1 | * | 8/2002 | Yoshida et al. | 62/126 |
| 2003/0156946 A1 | | 8/2003 | Tolbert, Jr. | |

FOREIGN PATENT DOCUMENTS

| | | |
|---|---|---|
| EP | 602 972 | 6/1994 |
| JP | 2001-061285 | 3/2001 |

* cited by examiner

*Primary Examiner*—Bentsu Ro
(74) *Attorney, Agent, or Firm*—Shoemaker and Mattare

(57) ABSTRACT

The arrangement as overload protection for the mains voltage (U) comprises an electric motor (1), a compression unit having a compressor (2), a mains voltage-monitoring unit (3), a device for reducing the load on the motor (1) and a control arrangement (4). The control arrangement (4) is connected to the mains voltage-monitoring unit (3) and to the device for reducing the load on the motor (1) such that the motor (1) is disconnected from the load as soon as the mains voltage (U) falls below a predetermined, first threshold value. The load on the motor (1) comes from the pressure difference between the inlet (E) and the outlet (A) of the compressor (2), which is driven by the motor (1).

36 Claims, 5 Drawing Sheets

Figure 1:
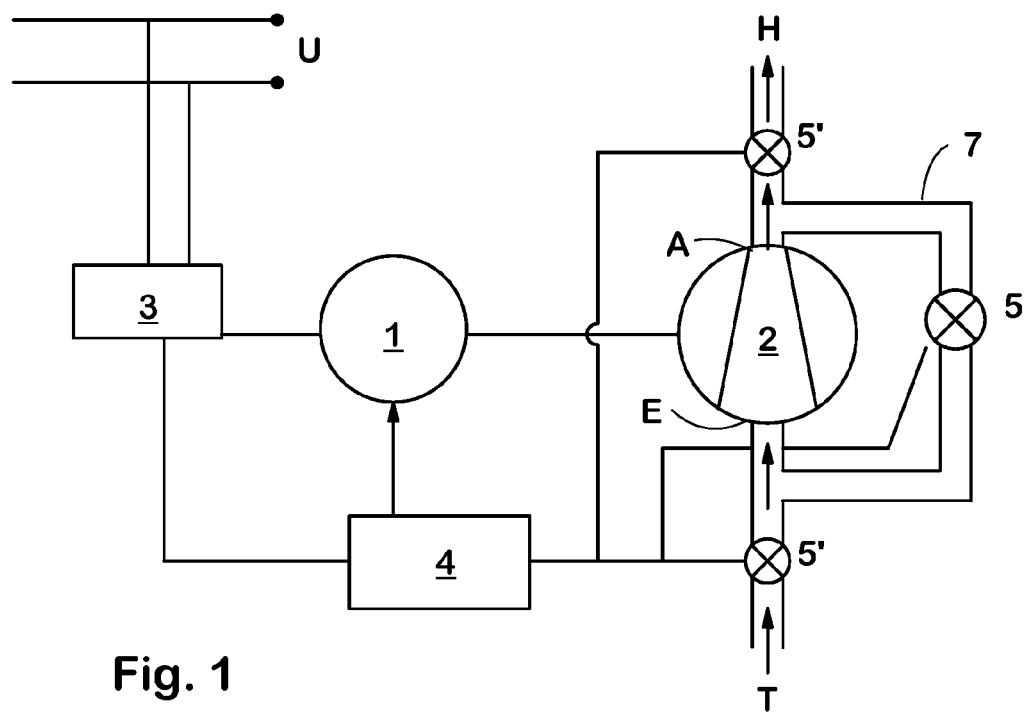

ARRANGEMENT FOR OVERLOAD PROTECTION AND METHOD FOR REDUCING THE CURRENT CONSUMPTION IN THE EVENT OF MAINS VOLTAGE FLUCTUATIONS

The invention relates to an arrangement for overload protection and a method for reducing the current consumption in the event of mains voltage fluctuations in accordance with the independent patent claims.

Compressors for cooling purposes are generally driven by electric motors. When there are dips in the mains voltage, these electric motors may be overloaded and overheated by the increased current level. In extreme cases, this may lead to the motors coming to a standstill. This means that the motor becomes overloaded and, on the other hand, results in loading of the power supply system.

On the other hand, cooling arrangements driven by electric motors subject the power supply system to a very irregular load during normal operation, since compressors for cooling purposes are generally operated at a relatively short switching cycle, for example 15 minutes cooling and 5 minutes resting. In particular, conventional motors, which have a high current consumption during start-up, have a destabilizing effect on the power supply system. This may result in mains voltage dips, which, in turn, subject the electric motors to a load.

The object of the invention is to overcome the known problems, in particular to provide overload protection when driving compressors.

This object is achieved by an arrangement for overload protection of an electric motor of a compression unit and a method for reducing the current consumption in the event of mains voltage fluctuations in accordance with the independent patent claims.

The arrangement for overload protection of an electric motor of a compression unit having a compressor comprises the motor, the compression unit, a mains voltage-monitoring unit, a device for reducing the load on the motor and a control arrangement. The control arrangement is connected to the mains voltage-monitoring unit and to the device for reducing the load on the motor such that the motor is disconnected from the load and/or the load is reduced as soon as the mains voltage falls below a predetermined, first threshold value, preferably 80 to 90% of the rated voltage, particularly advantageously 85% of the rated voltage.

The load on the motor is brought about by the compressor work, which produces the pressure difference between the inlet and the outlet of the compressor. For the purpose of reducing the load on the motor, the pressure difference between the inlet and the outlet of the compressor can thus be reduced. Advantageously, this takes place by means of a bypass between the inlet and the outlet which can be opened or closed using at least one valve.

Alternatively, the motor may also be connected to the compressor via a coupling. The load of the compressor can be adjusted, in particular reduced, and/or completely disconnected from the motor by means of this coupling.

The mains voltage-monitoring unit advantageously contains a voltage comparator. This continuously monitors the mains voltage. The response time of the voltage comparator is advantageously a maximum of 10 ms.

The control arrangement is preferably in interacting connection with a device for switching the electric motor off. When the undervoltage lasts longer than a predetermined period of time, for example 10 to 60 s, the electric motor is switched off. This prevents the motor from consuming current in the event of a long-lasting interference to mains operation and the power supply system from thus continuing to be subjected to a load. In addition, the motor is by this means protected against overheating.

The motor is particularly preferably provided with a device for reducing the current consumption in the start-up phase. For this purpose, NTC thermistors are advantageously used which can be connected in series into the main winding and into the auxiliary winding of a single-phase electric motor. Of advantage in the auxiliary winding is a start-up capacitor, which is connected in series with the NTC thermistor, and whose capacitance value is around 3 to 5 times as large as that of the running capacitor. The NTC thermistor limits the starting current through the start-up capacitor, which reduces capacitive current peaks in the start-up phase. The high capacitance of the start-up capacitor produces a large phase shift in the current between the auxiliary winding and the main winding, which facilitates start-up of the motor. The NTC thermistor in the main winding reduces the starting current through the main coil, which likewise reduces the current consumption in the start-up phase. When the rated speed is reached, firstly the start-up capacitor and the NTC thermistor, connected upstream thereof, are disconnected from the circuit, and only then is the NTC thermistor in the main winding bridged by means of a switch.

The control arrangement is preferably connected to the device for switching the motor on such that the motor is only switched on when the mains voltage is above a second, predetermined threshold value, preferably 90 to 95% of the mains voltage. Otherwise, the motor is prevented from being switched on. The mains voltage is thus no longer subjected to a load.

The load is advantageously only connected to the motor when it has reached a certain predetermined speed. This likewise reduces the current consumption in the start-up phase, as a result of which fluctuations in the mains voltage are further reduced. The predetermined speed is preferably the rated speed of the motor, but it may also be below this speed, for example 80% of the rated speed.

The compressor of the apparatus according to the invention is preferably built into an air-conditioning system or a refrigerator, since the voltage fluctuations produced by cooling systems are relatively high owing to their short cycle. In cooling systems, the apparatus according to the invention is therefore particularly useful.

The method for reducing the current consumption of an electric motor using a compression unit in the event of mains voltage fluctuations, in particular in the event of a reduction in the mains voltage, comprises the following steps:
  monitoring the mains voltage
  reducing the load on the motor by means of the compressor when the mains voltage falls below a first threshold value, with the result that the motor is running on approximately no-load.

The reduction in the load on the motor can be achieved by the pressure difference between the inlet and the outlet of the compressor being reduced. This pressure difference is particularly advantageously reduced to zero, since in this case almost the entire load is removed from the motor. The reduction should advantageously take place within less than 30 ms, particularly advantageously within approximately 20 ms, in order for the reaction time to be short enough to counteract a severe voltage dip and to prevent the motor from coming to a standstill.

The pressure difference can be reduced by opening and/or closing one or more valves in a bypass between the inlet and the outlet of the compressor. In this case, it is advantageous if, by opening the bypass, the other paths of the medium to be compressed, for example coolant, are closed. It is thus possible to prevent pressure decay in the cooling system.

Alternatively, it is also possible for the load to be disconnected from the motor by means of a coupling. The load is thus removed completely and very rapidly from the motor, and the motor is running on no-load within a very short period of time.

It is also advantageous for the time during which the motor runs on no-load to be measured, and for the motor to be switched off after a predetermined period of time on no-load. This prevents the motor from continuing to subject the mains voltage to a load or from overheating in the case of longer-lasting voltage dips. Advantageously, this predetermined period of time is in the range from 10 to 60 s.

An electric motor is particularly preferably used which can be supplied with a reduced current during the start-up phase. As a result, the mains voltage is subjected to a lesser load when the motor is switched on than would be the case in a conventional motor.

One possibility of supplying a reduced current to an electric motor during the start-up phase is given if an NTC thermistor is connected in series with the main winding of the motor at the switch-on time. This reduces the starting current through the main winding. In addition, an arrangement comprising an NTC thermistor in series with a start-up capacitor is particularly advantageously connected in series with the auxiliary winding. This arrangement should be connected in parallel with the running capacitor, in order for the capacitances to be added together and thus for a large phase shift between the main winding and the auxiliary winding to be produced during the switch-on process. In order to prevent capacitive current peaks, the current across the start-up capacitor is limited by the NTC thermistor at the time at which the motor is switched on and is only increased by heating the NTC thermistor. If, during the course of the start-up, the rotor slip of the motor approaches zero, first the arrangement in series with the auxiliary winding is disconnected from the circuit, and then the NTC thermistor in series with the main winding is bridged by means of switches. Thereupon, the motor is in the normal mode of operation, and the phase difference between the main winding and the auxiliary winding is produced merely by the running capacitor, whose capacitance is preferably approximately three to five times less than that of the start-up capacitor.

Furthermore, it is advantageous if the electric motor is only connected to the load of the compressor once a predetermined speed has been reached. As a result, the motor likewise consumes less current during the start-up phase. The predetermined speed is preferably the rated speed of the motor, but it may also be below this rated speed.

The first threshold value for the pressure reduction is preferably between 80 and 90% of the rated voltage, particularly preferably 85% of the rated voltage. The second threshold value for the renewed build-up of the pressure is between 90 and 95% of the rated voltage. Overloading of the power supply system is thus efficiently counteracted.

Figure 2:
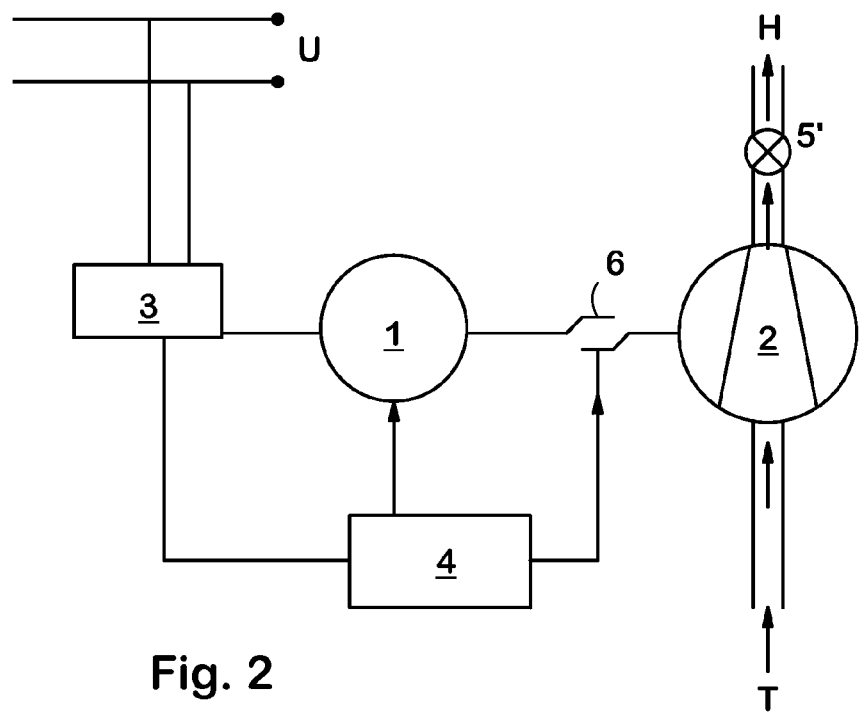
Figure 3:
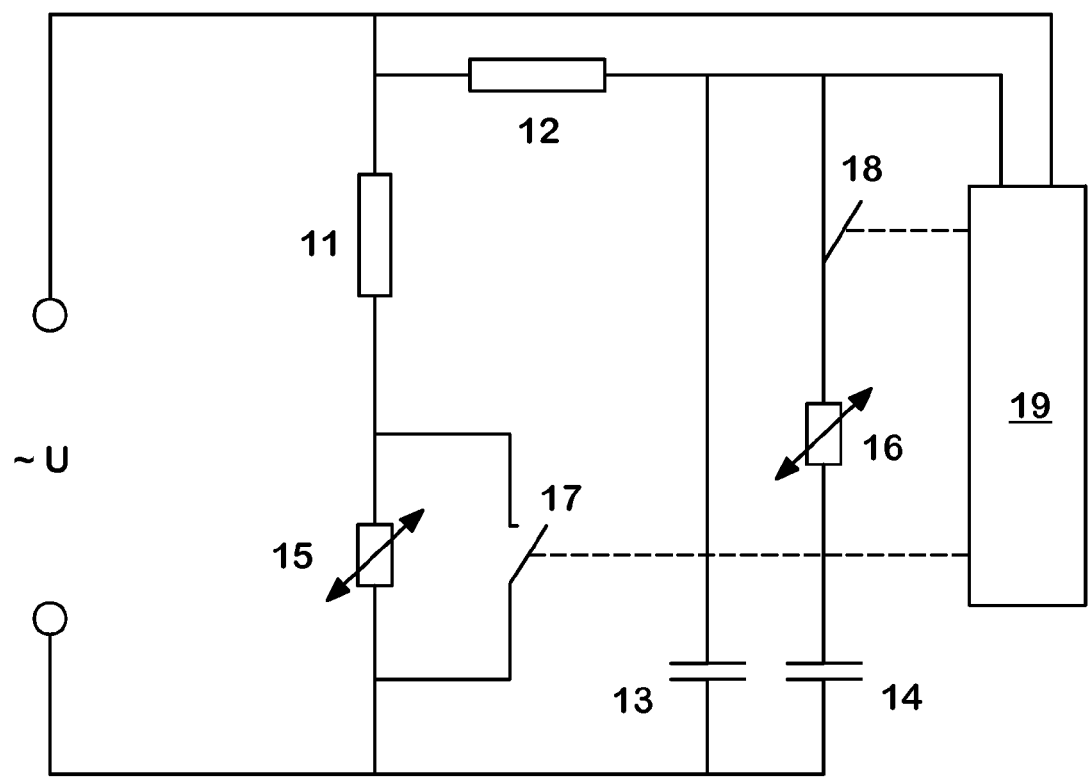
Figure 8:
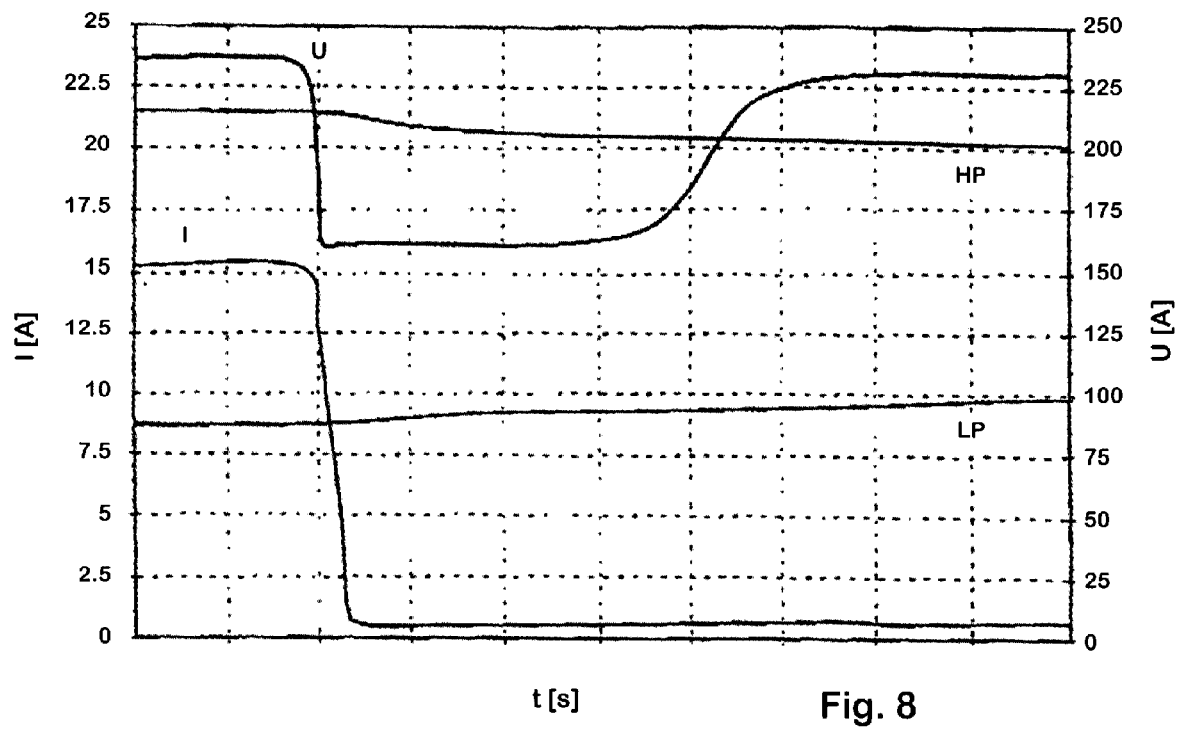
Figure 9:
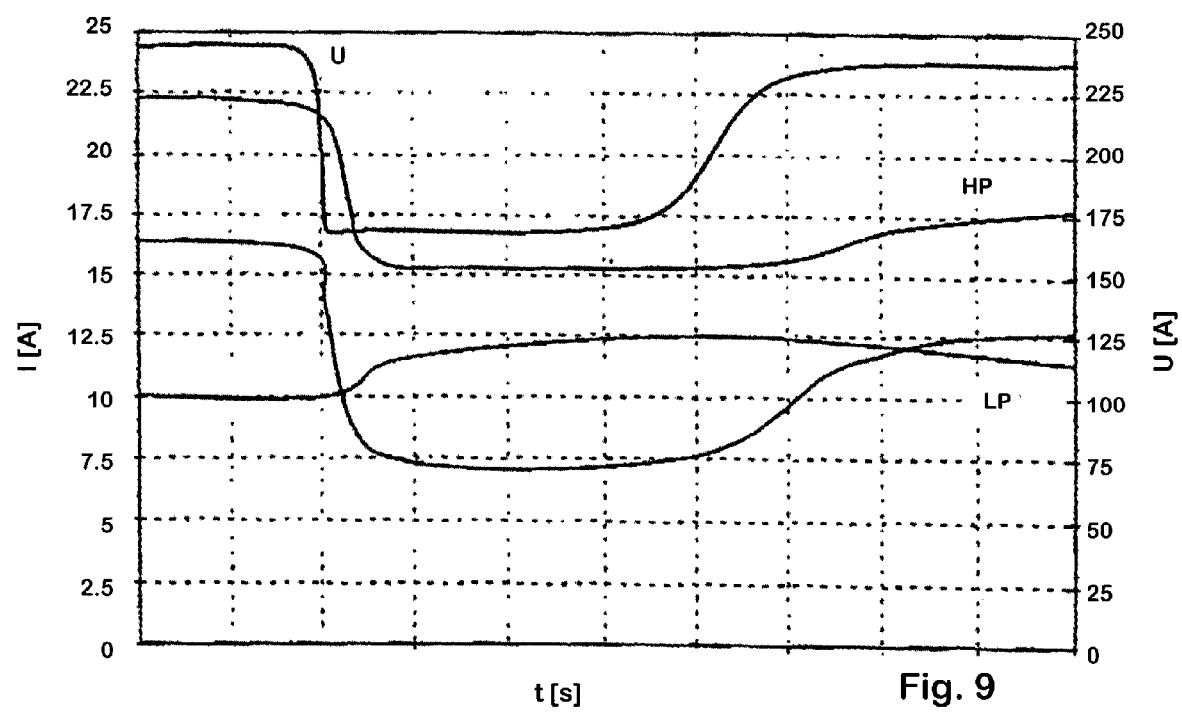

The invention will be explained in more detail below with reference to exemplary embodiments and drawings, which show:

FIG. 1: shows a schematic illustration of the arrangement according to the invention, FIG. 2: shows a schematic illustration of an alternative arrangement, FIG. 3: shows a schematic circuit diagram of a preferred electric motor, FIGS. 4 to 7: show graphs of the current consumption of the electric motor and the pressure difference between the inlet and the outlet of the compressor, and FIGS. 8 and 9: show graphs of the waveforms for the average current in the case of a voltage dip and of the pressure difference between the inlet and the outlet of the compressor.

The illustrations in FIG. 1 and FIG. 2 show two alternative embodiments of the arrangement according to the invention. The electric motor 1 drives a compressor 2. A medium, for example a coolant, having a low pressure T is compressed in the compressor to have a high pressure H. The mains voltage-monitoring unit 3 constantly measures the mains voltage U and passes the information on to the control arrangement 4. In FIG. 1, the motor is permanently connected to the compressor, and the inlet E and the outlet A of the compressor can be short-circuited using the valves 5, 5' via the bypass 7. During normal operation of the compression unit, the valves 5' are open and the valve 5 is closed. If the mains voltage U falls below the first threshold value of 85% of the rated voltage, the control arrangement 4 causes the valve 5 to be opened and the valves 5' to be closed. The pressure difference between the pressure LP at the inlet E and the pressure HP at the outlet A is thus reduced to preferably less than 2 bar, particularly preferably less than 1 bar, within 20 ms, and the load on the motor 1 is reduced sharply.

Instead of a bypass 7 between the inlet E and the outlet A of the compressor 2, the motor 1 may also be connected to the compressor 2 via a coupling 6, as can be seen in FIG. 2. When the mains voltage U falls below the first threshold value, the coupling 6 is released, and thus the compressor 2 is disconnected from the motor 1.

In both cases, the motor 1 is only connected again to the full load of the compressor 2 when the mains voltage U rises above the second threshold value of 90 to 95% of the rated voltage. If this does not take place within 10 to 60 s, the motor 1 is switched off and only switched on again when the mains voltage U exceeds the second threshold value. This prevents, on the one hand, the power supply system from being subjected to any further load, and, on the other hand, the motor 1 is thus protected against overheating. Once it has been switched on, the motor 1 is only connected to the load of the compressor 2 when it has reached a certain speed, preferably at least 80% of the rated speed.

The circuit diagram of the preferred electric motor 1 is illustrated in FIG. 3. The motor 1 comprises a main winding 11 and an auxiliary winding 12. An NTC thermistor 15 can be connected in series with the main winding 11. A running capacitor 13 is connected in series with the auxiliary winding 12.

In parallel therewith, a start-up capacitor 14 can be connected in series with a second NTC thermistor 16, in series with the auxiliary winding 12. The switches 17 and 18 are operated by the control arrangement 20.

When the motor 1 is switched on, the two NTC thermistors 15 and 16 and the start-up capacitor 14 are connected into the circuit. The NTC thermistor 15 reduces the current consumption of the main winding 11 at the instant of the switch-on process, and the NTC thermistor 16 reduces the current through the start-up capacitor 14. In the start-up capacitor 14, a capacitive current peak is thus prevented when the motor is switched on. Owing to the two capacitors 13 and 14, the phase shift of the currents through the main winding 11 and the auxiliary winding 12 is large, which favours start-up of the motor. As soon as the rotor slip of the motor approaches zero, first the start-up capacitor 14 is removed from the circuit via the switch 18 by means of the control arrangement, and then the NTC thermistor 15 is bridged via the switch 17. The motor is in this case in the normal mode of operation, and the phase shift in the auxiliary winding is produced by the running capacitor 13.

Figure 4:
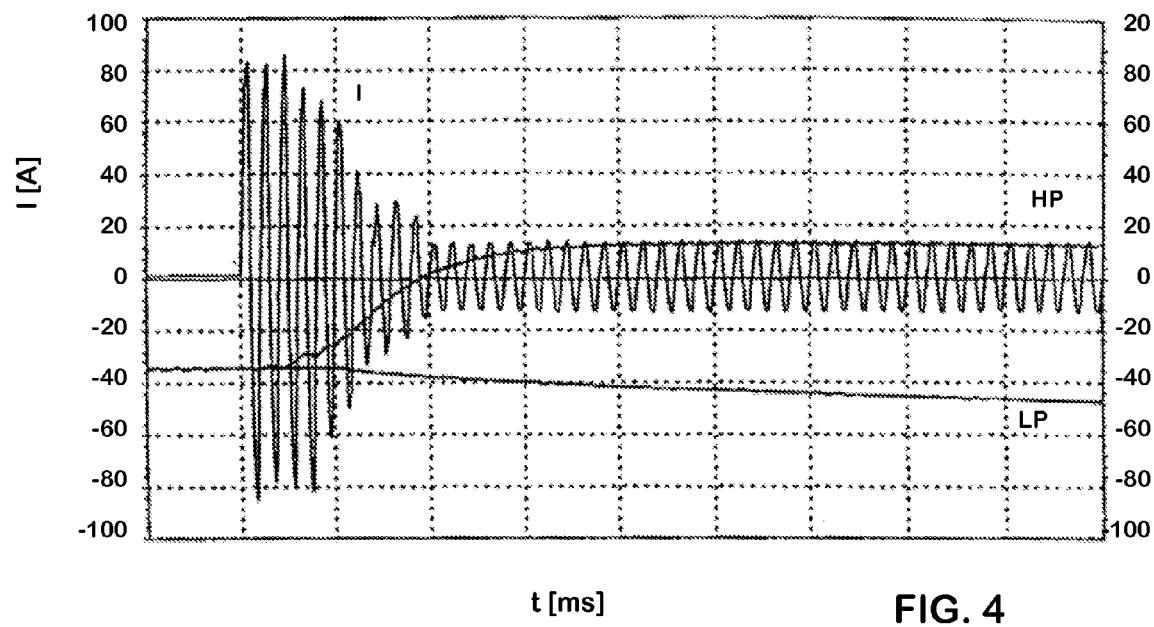
Figure 5:
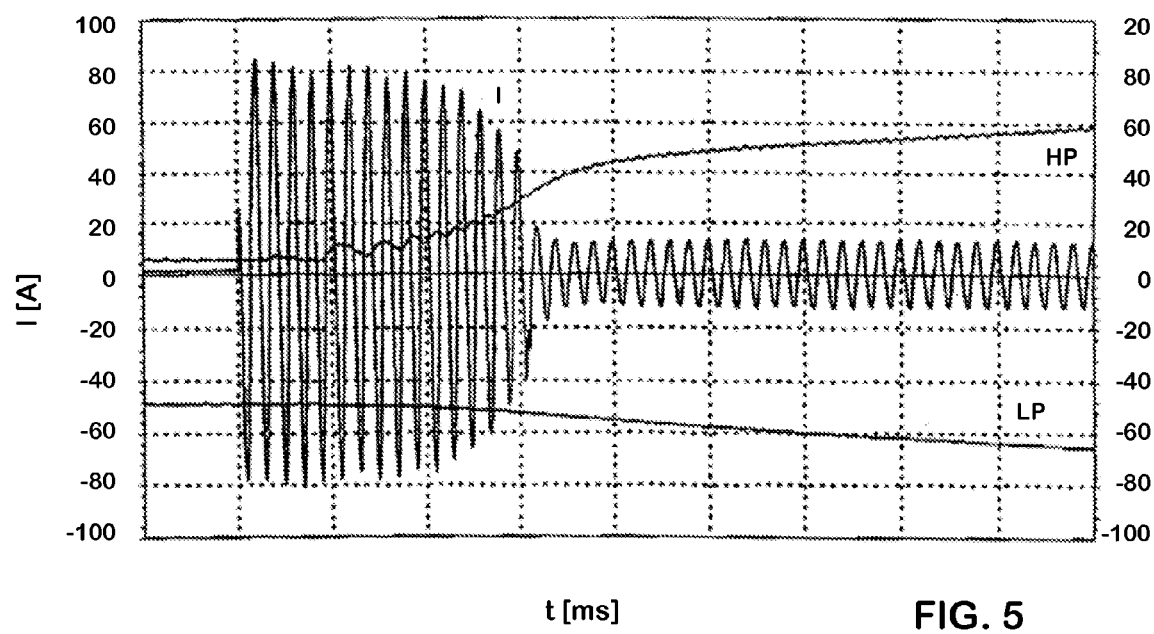

The current waveform I when a conventional electric motor 1 is switched on at a compressor 2 is illustrated in FIG. 4. The pressure difference between the pressure LP at the inlet E and the pressure HP at the outlet A of the compressor 2 is zero at the switch-on time. The running capacitance of the motor 1 is 35 μF, the starting capacitance is 88 μF, and the mains voltage U is 228 V. The current peak is 86 A. In FIG. 5, the same motor 1 is switched on but the pressure difference between the inlet E and the outlet A of the capacitor 2 is 5.2 bar. The peak current intensity is 85 A, and the start-up process lasts around twice as long. With an arrangement such as this, the power supply system is subjected to a severe load with each switch-on process.

Figure 6:
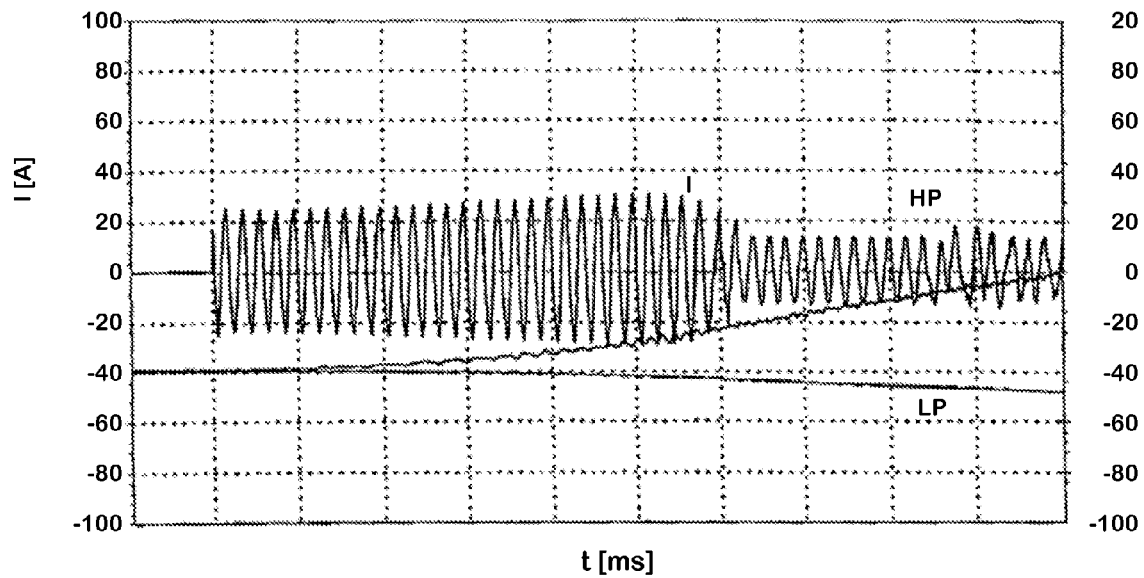
Figure 7:
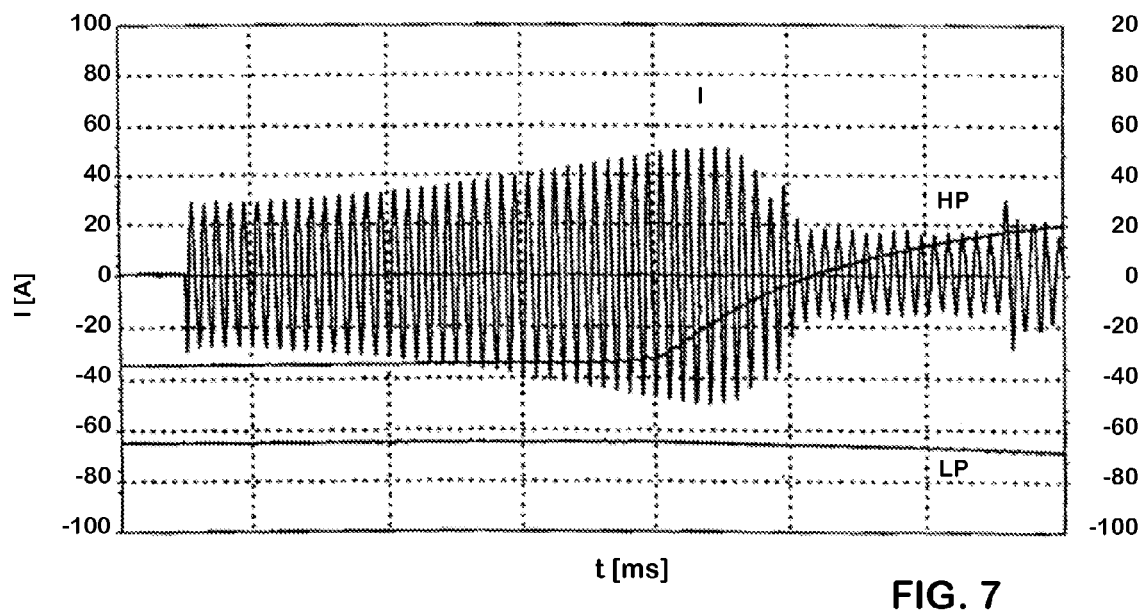

FIG. 6 shows the analogous situation to FIG. 4 with a motor 1 as described in FIG. 3, the mains voltage U being 229 V. The peak current intensity is still only 28 A. When the pressure difference between the inlet E and the outlet A of the compressor 2 is 3.5 bar at the beginning of the switch-on phase, the peak current intensity is increased to 51 A, and the duration of the switch-on process is approximately doubled. The current waveform I and the characteristic for the pressure LP at the inlet E and HP at the outlet A of the capacitor 2 can be seen in FIG. 7.

These illustrations show that the current peaks can thus be markedly reduced when the motor 1 is, on the one hand, only started when the load on the motor 1 is low, and, on the other hand, the voltage supply of the motor 1 is connected in accordance with FIG. 3.

FIGS. 8 and 9 show the consequences of a voltage dip from 230 V to 160 V. A conventional apparatus without overload protection can be seen in FIG. 8. Owing to the voltage dip, the motor 1 fails completely and also does not start up again when the mains voltage U is normalized. When started again, the motor 1 shown in FIG. 5 will require a high start-up current.

In FIG. 9, the pressure difference between the pressure LP at the inlet E and the pressure HP at the outlet A of the compressor 2 is reduced to approximately ⅓ of the original pressure difference within 30 ms following the voltage dip. The motor 1 thus continues to run at a reduced current I. When the mains voltage U rises again to the rated voltage, the pressure difference is increased again, and the motor 1 thereafter runs at the normal current consumption.

The invention claimed is:

1. Arrangement for overload protection of an electric motor of a compression unit having a compressor, the arrangement having a mains voltage-monitoring unit connected between a control arrangement and a mains voltage, and having a device for reducing the load on the motor, wherein the control arrangement is connected to the device for the purpose of reducing the load in the event of the mains voltage falling below a predetermined, first threshold value, and wherein at least one pressure-compensating valve is provided on a bypass between the inlet and the outlet of the compressor for reducing the pressure between the pressure at the inlet and the pressure at the outlet.

2. Arrangement according to claim 1, wherein the mains voltage-monitoring unit has a voltage comparator.

3. Arrangement according to claim 1, wherein the control arrangement is in interacting connection with a device for switching the electric motor off, such that the electric motor is switched off when the main voltage falls below a predetermined first threshold value for longer than a predetermined period of time.

4. Arrangement according to claim 1, wherein the control arrangement is in interacting connection with a device for switching the electric motor on, such that the electric motor is only switched on when the mains voltage rises above a second threshold value.

5. Arrangement according to claim 1, wherein the control arrangement is in interacting connection with a device for connecting the electric motor to the load, the load only being connected to the electric motor when it has reached a predetermined speed.

6. Arrangement according to claim 1, wherein the compression unit is built into an air-conditioning system or a refrigerator.

7. Arrangement for overload protection of an electric motor of a compression unit having a compressor, the arrangement having a mains voltage-monitoring unit connected between a control arrangement and a mains voltage, and having a device for reducing the load on the motor, wherein the control arrangement is connected to the device for the purpose of reducing the load in the event of the mains voltage falling below a predetermined, first threshold value, and wherein the connection of the electric motor to the compressor is made via a coupling such that it can be adjusted and/or disconnected.

8. Arrangement according to claim 7, wherein the mains voltage-monitoring unit has a voltage comparator.

9. Arrangement according to claim 7, wherein the control arrangement is in interacting connection with a device for switching the electric motor off, such that the electric motor is switched off when the main voltage falls below a predetermined first threshold value for longer than a predetermined period of time.

10. Arrangement according to claim 7, wherein the control arrangement is in interacting connection with a device for switching the electric motor on, such that the electric motor is only switched on when the mains voltage rises above a second threshold value.

11. Arrangement according to claim 7, wherein the control arrangement is in interacting connection with a device for connecting the electric motor to the load, the load only being connected to the electric motor when it has reached a predetermined speed.

12. Arrangement according to claim 7, wherein the compression unit is built into an air-conditioning system or a refrigerator.

13. Arrangement for overload protection of an electric motor of a compression unit having a compressor, the arrangement having a mains voltage-monitoring unit connected between a control arrangement and a mains voltage, and having a device for reducing the load on the motor, wherein the control arrangement is connected to the device for the purpose of reducing the load in the event of the mains voltage falling below a predetermined, first threshold value, and wherein the electric motor is provided with a device for reducing the current consumption in the start-up phase of the electric motor which comprises an NTC thermistor which can be connected in series with a main winding of the electric motor, and an arrangement which can be connected in series with an auxiliary winding of the electric motor, comprising an NTC thermistor and a start-up capacitor.

14. Arrangement according to claim 13, wherein the mains voltage-monitoring unit has a voltage comparator.

15. Arrangement according to claim 13, wherein the control arrangement is in interacting connection with a device for switching the electric motor off, such that the electric motor is switched off when the main voltage falls below a predetermined first threshold value for longer than a predetermined period of time.

16. Arrangement according to claim 13, wherein the control arrangement is in interacting connection with a device for switching the electric motor on, such that the electric motor is only switched on when the mains voltage rises above a second threshold value.

17. Arrangement according to claim 13, wherein the control arrangement is in interacting connection with a device for connecting the electric motor to the load, the load only being connected to the electric motor when it has reached a predetermined speed.

18. Arrangement according to claim 13, wherein the compression unit is built into an air-conditioning system or a refrigerator.

19. Method for reducing the current consumption of an electric motor driving a compression unit having a compressor in the event of mains voltage fluctuations, comprising the steps of: monitoring the mains voltage and reducing the load of the electric motor caused by the compressor when the mains voltage falls below a first threshold value, such that the electric motor is running on approximately no-load, wherein the load is removed from the electric motor by means of reducing the pressure difference between the pressure at the inlet and the pressure at the outlet of the compressor by opening and/or closing one or more valves in a bypass between the inlet and the outlet of the compressor.

20. Method according to claim 19, wherein the pressure difference between the pressure at the inlet and the pressure at the outlet of the compressor is reduced to zero.

21. Method according to claim 19, wherein the load is disconnected from the electric motor by means of a coupling.

22. Method according to claim 19, wherein the time during which the electric motor is on no-load is measured, and wherein the electric motor is switched off after a predetermined period of time on no-load.

23. Method according to claim 19, wherein the current through the electric motor is reduced during the start-up phase.

24. Method according to claim 19, wherein the electric motor is only connected to the load of the compressor once a predetermined speed has been reached.

25. Method according to claim 19, wherein the first threshold value for reducing the load on the electric motor is 80 to 90% of the rated voltage.

26. Method according to claim 19, wherein a second threshold value for increasing the load on the electric motor is 90 to 95% of the rated voltage.

27. Method according to claim 19, wherein the load on the electric motor is reduced within less than 30 ms, preferably within approximately 20 ms.

28. Method for reducing the current consumption of an electric motor driving a compression unit having a compressor in the event of mains voltage fluctuations, comprising the steps of:
monitoring the mains voltage and
reducing the load on the electric motor caused by the compressor when the mains voltage falls below a first threshold value, such that the electric motor is running on approximately no-load,
wherein the current through the electric motor is reduced during the start-up phase, and during the start-up phase an NTC thermistor is connected in series with a main winding of the electric motor, and an arrangement comprising a start-up capacitor in series with an NTC thermistor is connected in series with an auxiliary winding of the electric motor.

29. Method according to claim 28, wherein the pressure difference between the pressure at the inlet and the pressure at the outlet of the compressor is reduced to zero.

30. Method according to claim 28, wherein the load is disconnected from the electric motor by means of a coupling.

31. Method according to claim 28, wherein the time during which the electric motor is on no-load is measured, and wherein the electric motor is switched off after a predetermined period of time on no-load.

32. Method according to claim 28, wherein the electric motor is only connected to the load of the compressor once a predetermined speed has been reached.

33. Method according to claim 28, wherein the first threshold value for reducing the load on the electric motor is 80 to 90% of the rated voltage.

34. Method according to claim 28, wherein a second threshold value for increasing the load on the electric motor is 90 to 95% of the rated voltage.

35. Method according to claim 28, wherein the load on the electric motor is reduced within less than 30 ms, preferably within approximately 20 ms.

36. Method according to claim 28, wherein the load on the electric motor is reduced within approximately 20 ms.

\* \* \* \* \*